United States Patent [19]

Hitchcock

[11] 4,414,564

[45] Nov. 8, 1983

[54] NONLINEAR EDGE PEAKING SYSTEM AND METHOD

[75] Inventor: James E. Hitchcock, Knoxville, Tenn.

[73] Assignee: Magnavox Consumer Electronics Company, New York, N.Y.

[21] Appl. No.: 335,088

[22] Filed: Dec. 28, 1981

[51] Int. Cl.³ .............................................. H04N 5/14
[52] U.S. Cl. ...................................... 358/37; 358/166
[58] Field of Search ..................... 358/37, 166, 160; 307/263, 268

[56] References Cited

U.S. PATENT DOCUMENTS

| | | | |
|---|---|---|---|
| 2,740,071 | 3/1956 | Goldmark | 358/166 |
| 2,851,522 | 9/1958 | Hollywood | 358/166 |
| 4,030,121 | 6/1977 | Faroudja | 358/37 |
| 4,080,628 | 3/1978 | Jirka | 358/37 |
| 4,263,616 | 4/1981 | Lee | 358/166 |
| 4,331,971 | 5/1982 | Bretl | 358/37 |

Primary Examiner—Tommy P. Chin
Attorney, Agent, or Firm—Pitts, Ruderman & Kesterson

[57] ABSTRACT

A nonlinear edge peaking system (10) is provided which reduces the rise and fall times of input signal transitions and prevents the introduction of excessive preshoot and overshoot. The system (10) includes a first circuit (76) which delays the input signal. A second circuit (48) which is connected in parallel with the first circuit produces an output which is the approximation of the absolute value of the widened second derivative having a preselected offset bias. A third circuit (42) connected in parallel with the first and second circuit produces at its output a delayed first derivative of the input signal. The combination of the output of the second and third circuit is differentiated, amplified, inverted and added to the delayed input signal producing a peaked or enhanced signal with reduced rise and fall times.

12 Claims, 9 Drawing Figures

# NONLINEAR EDGE PEAKING SYSTEM AND METHOD

DESCRIPTION

Technical Field

This invention is directed to a nonlinear edge peaking system, and is more specifically directed to such a system which decreases the rise and fall times of signals to be processed such as the video and chroma signals in a television receiver. The rise and fall times of the input signal are reduced without introducing excessive preshoot or overshoot and without substantially distorting the frequency response.

Background Art

Various types of prior art video peaking or enhancement circuits are known. These prior art systems usually include the steps of taking the approximate first or second derivative waveform and adding the signal produced to the original waveform with the proper polarity, amplitude and time delay to reduce the rise and fall times of transients. While such systems serve to reduce the rise and fall times of the signals, normally distortions are generated which deleteriously affect the signal produced. For example, such signal processing can produce excessive preshoot and overshoot and/or produce an excessively peaked frequency response in the transmission path.

While such peaking and enhancement circuits may have various applications, in the case of television receivers, the mentioned distortions of the video signals will become apparent in the picture viewed. Excessive preshoot and overshoot generally result in the harsh outlining of objects in the picture. Preshoots and overshoots in the white going direction are normally more apparent than in the black going direction and can produce cathode ray tube "blooming", that is, an increase in the spot size.

The excessively peaked frequency response emphasizes picture material and noise corresponding to the mid-to-high frequencies. This excessively peaked frequency response produces a noisy picture in a television receiver, especially, if the received signal is pre-peaked and/or is a weak fringe signal where signal noise is significant. Known prior art generally relating to the field of the invention are described and illustrated in U.S. Pat. Nos. 2,678,954; 2,851,522; 2,740,071; 4,040,121; 4,080,628; and 4,263,616.

Since it is desirable to process the signal typically in a video chain of a television receiver, that is, within the base band frequency, with a peaking system, it is an object of the present invention to provide a nonlinear edge peaking system which decreases the rise and fall times of chroma/video transients without introducing excessive preshoot or overshoot. Another object of the present invention is to provide a nonlinear edge peaking system which decreases the rise and fall times of the chroma/video transients without excessively distorting the frequency response of the input signal.

Another object of the present invention is to provide such an edge peaking system which can be applied in processing video/chroma signals in television receivers and which will also have application in processing video/chroma signals in closed circuit television, television camera circuits and more generally, in any apparatus which develops and/or uses video/chroma type signals.

Disclosure of the Invention

Other objects and advantages will in part be obvious, and will in part appear hereinafter, and will be accomplished by the present invention which provides a method and apparatus for decreasing the rise and fall times of video/chroma transitions without introducing or altering the input signal in a manner which will significantly reduce the quality of the picture produced. More specifically, a system used to practice the invention will include means for accomplishing each of the subsequent steps.

The input signal which is to be corrected or processed by the method and system of the present invention will be delayed by a first circuit. The second circuit which is connected in parallel with the first circuit includes means for taking a widened second derivative of the input signal and means for taking the absolute value of the second derivative and means for adding a preselected offset to the signal after the absolute value signal has been produced. The third circuit is connected parallel with the first and second circuit and includes means for taking the first derivative of the input signal and for delaying the input signal such that the output of the second circuit and the first circuit are timed coincident. The ratio of the output of the first circuit and the second circuit is then taken with the output of the first circuit being the denominator and the output of the third circuit being the numerator. The output of this fourth circuit which is a ratio waveform is then processed and added to the delayed input signal produced by the first circuit to produce an overall waveform which is modified to contain fast rise and fall times without excessive preshoot and overshoot.

BRIEF DESCRIPTION OF THE DRAWINGS

FIG. 5A illustrates the edge transitions of a typical input waveform, while FIG. 5B is the desired waveform with a fast arise time, and FIG. 5C illustrates the correction or peaking signal which is added to the signal of FIG. 5A to produce the signal illustrated in 5B.

BEST MODE FOR CARRYING OUT THE INVENTION

Figure 1:
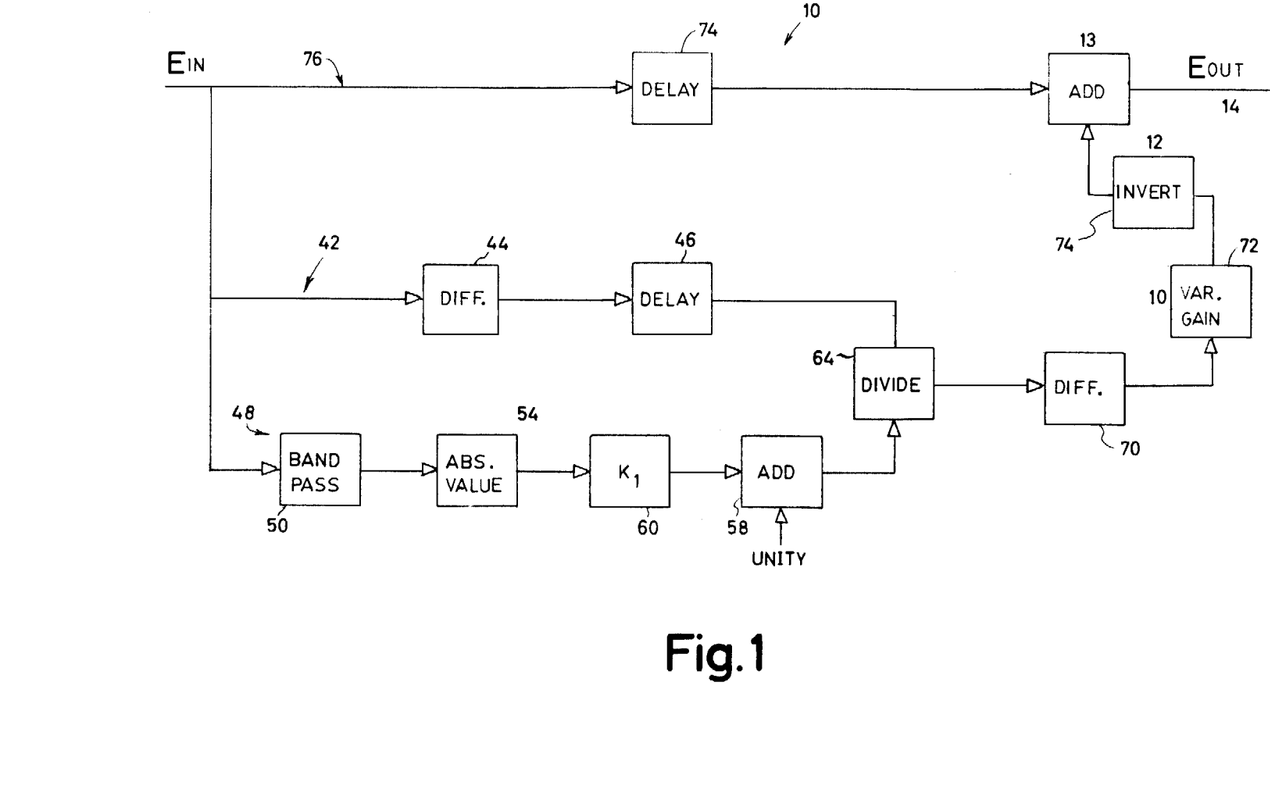
FIG. 1 is a block diagram illustrating a nonlinear peaking system constructed in accordance with various features of the invention.

Referring now to the figures, FIG. 1 illustrates a block diagram of a nonlinear edge peaking system generally indicated at 10 which is constructed in accordance with various features of the present invention. This system is particularly suitable for processing video and/or chroma signals in a television receiver. Additional applications include video and chroma signal processing in closed circuit television, television camera circuits, and more generally, any apparatus which develops and/or uses video/chroma signals. Preferably, the system is connected anywhere within the video or chroma chain of a receiver and is designed to process the base band frequency waveform as opposed to radio frequency signal. Thus, the input singal (Ein) is fed from any location in the video chain of television receiver, for example, and the output signal (Eout) depicts the enhanced or peaked signal produced by the processing of the present system.

Figure 3:
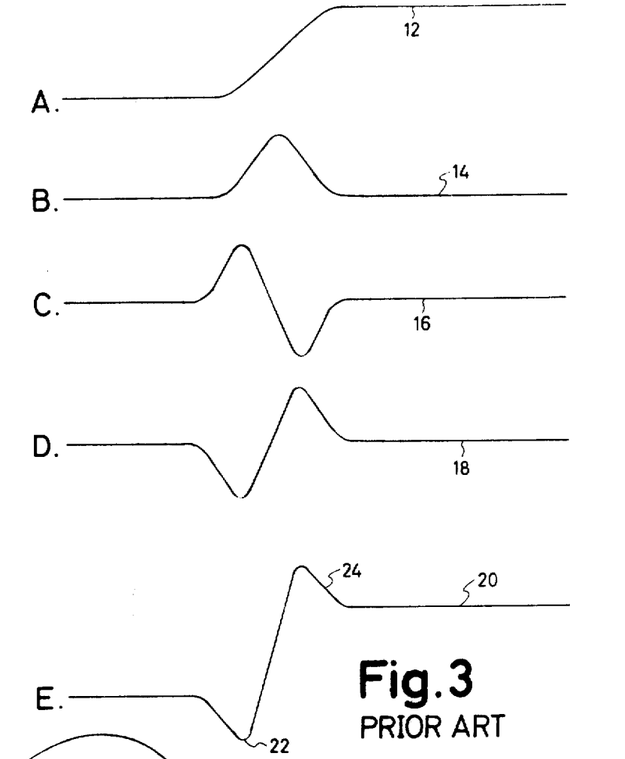
FIG. 3 illustrates a typical input waveform from the video chain at the base band frequency, of a television receiver, for example, and further depicts in FIGS. 3B-E, respectively, the first derivative of the input waveform, the second derivative of the input waveform, the inverted second derivative of the input waveform, and the combined input waveform and the inverted second derivative. This final waveform, in FIG. 3E illustrates the distortion due to excessive preshoot and overshoot produced by peaking and enhancement circuits of a certain prior art.

The operation of the system illustrated in FIG. 1 can be more clearly understood by first describing the peaking or enhancement signals produced by prior art systems. To this end, FIG. 3A illustrates a typical input waveform 12 from the video chain of a television receiver. FIGS. 3B-C depict the first derivative 14 and second derivative 16 of the input waveform 12 produced by differentiaters of conventional design and well known by those skilled in the art. FIG. 3D depicts the inverted second derivative 18, and FIG. 3E depicts the enhanced waveform or output 20 which is the combined input waveform and inverted second derivative, that is, the sum of the waveforms depicted in FIG. 3A and FIG. 3D. It will be noted that the waveform depicted in FIG. 3E is distorted due to excessive preshoot 22 and overshoot 24. This distortion in a television receiver results in harsh outlining of the picture objects and can result in cathode ray tube "blooming", that is, an increase in the spot size, particularly in the white going direction, which is more noticeable by a viewer.

Figure 4:
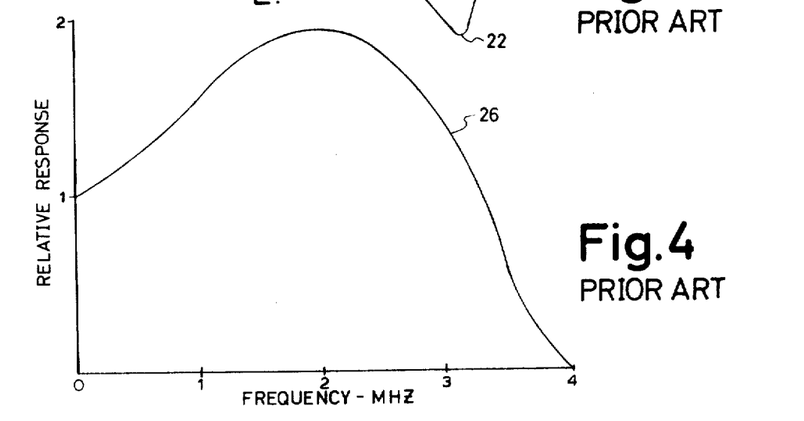
FIG. 4 illustrates an excessively distorted frequency response of conventional prior art peaking systems.

FIG. 4 illustrates a further example of distortion produced by certain prior art peaking systems. In this illustration, an excessively distorted frequency response 26 of the input signal is depicted. Such an excessively peaked frequency response emphasizes picture material and noise corresponding to mid-to-high frequencies and produces a noisy picture in the television receiver. This is especially apparent if the received signal is prepeaked and/or if the received signal is a weak fringe type signal in which receiver noise is a factor.

Figure 5:
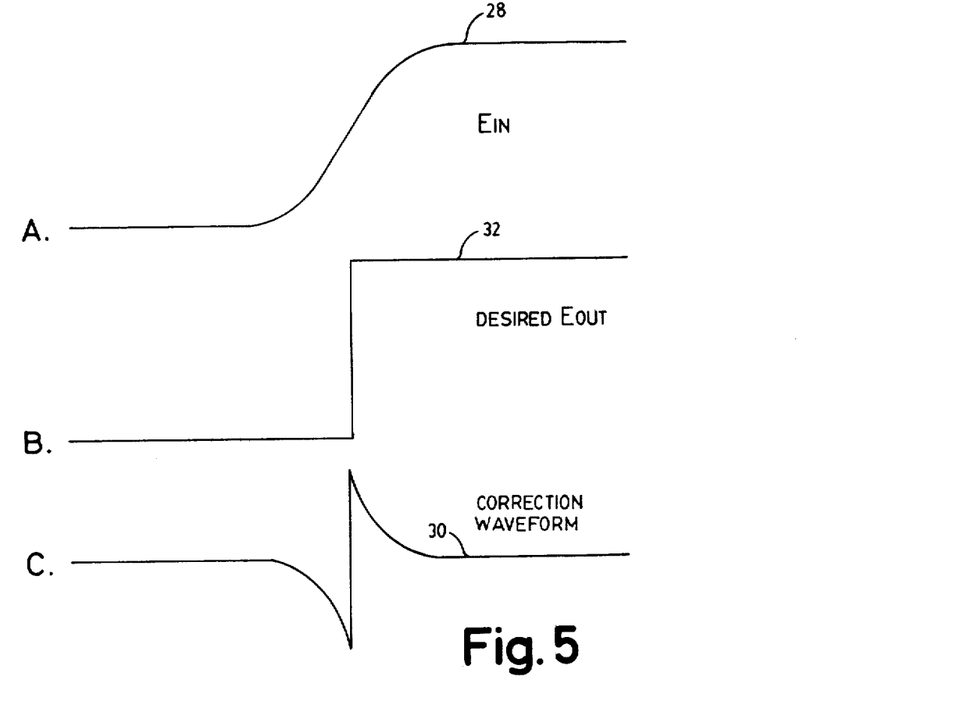

In order to reduce edge rise and fall times without introducing excessive preshoot and overshoot, a preselected correction waveform must be added to the edge transition of the input signal to produce the desired output signal. FIG. 5A illustrates a typical input signal 28 (Ein) from the video chain of a television receiver, for example, and FIG. 5C illustrates a correction waveform 30 which can be added to the edge transitions depicted in FIG. 5A to produce a desired output signal or corrected waveform 32 depicted in FIG. 5B.

Figure 6:
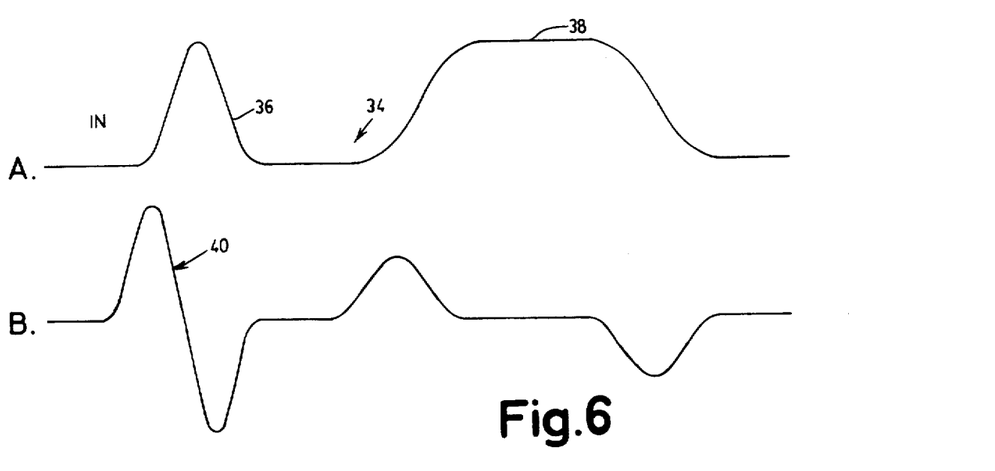
FIG. 6 illustrates a series of waveforms and the steps taken in the signal processing accomplished by the present invention which produces an approximation of the waveform illustrated in FIG. 5B.

The sequence of steps of the present system and method used in producing an approximation of the corrected waveform depicted in FIG. 5B are illustrated in FIGS. 6A-G. FIG. 6A represents a typical input waveform 34 from the video chain of a television receiver and comprises a pulse 36 of sine-squared shape, with a typical 2T half amplitude duration, and a bar waveform 38 having edges or transitions of 2T rise and fall time. In typical waveforms of television receivers, the period or T will equal approximately 125 nanoseconds.

The waveform 40 of FIG. 6B represents the first derivative of the input signal (Ein) obtainable by passing Ein through the first derivative channel or circuit 42 of the system 10 illustrated in FIG. 1. This first derivative can be produced by a hi-pass filter 44 of conventional design.

As shown in FIG. 1, the second channel or circuit 48 is connected in parallel with the first derivative channel, and includes a band pass filter 50 of conventional design which produces a widened second derivative of the input signal. FIG. 6C represents a widened second derivative waveform 52 obtained by passing the input signal through the band pass type filter 50.

FIG. 6D represents the absolute value of FIG. 6C which can be approximated for medium to large inputs by an overdriven squaring circuit 54 of conventional design. A unity bias level or offset has been added to the waveform 56 as illustrated in FIG. 6D. It will be noted that this waveform 56 is the output of the ADD circuit 58 which is fed by the amplifier 60.

By introducing an appropriate time delay into the first derivative channel 42 (FIG. 6B) such that the center points of the FIGS. 6B and 6D waveforms are timed coincident, a ratio of these two waveforms can be taken using the delayed first derivative as the numerator, and the approximate absolute value of the widened second derivative added to a unity bias, which is the output of the second circuit 48, as the denominator. Upon completion of this step, by the divide circuit 64 (FIG. 1) of conventional design, the waveform 66 of FIG. 6E is obtained. It will be noted that this is a ratio waveform. The waveform of FIG. 6D has a minimal value of unity in the preferred embodiment.

FIG. 6F illustrates a waveform 66 which is a differentiation of the ratio waveform 66. This differentiation step is accomplished by the circuit 70 (FIG. 1) of conventional design. The output of the differentiator circuit 70 is then amplified by the amplifier 72 and inverted by inverter 74. With polarity inversion and a proper gain factor, the FIG. 6F waveform can be added to the input signal (after a proper time delay of the input signal accomplished by the delay circuit 74 of the circuit or channel generally depicted at 76), to produce an overall waveform 78 (Eout) modified to contain fast rise and fall times with minimum preshoot and overshoot. This modified or enhanced signal 78 is illustrated by the solid line in FIG. 6G as (Eout) and is compared with the input signal (Ein).

To produce a smooth ratio output waveform without peaks or "bumps" at the low amplitude ends of a waveform, it is necessary for the time duration of the second derivative waveform to be slightly longer than the time duration of the first derivative waveform. The centers of these two waveforms must coincide in time, however. If these conditions are met, a smoothly changing ratio waveform will be obtained which, after differentiation, will produce the desired correction or enhancement waveform depicted in FIG. 6F. The relatively wider time duration of the second derivative can be produced by any appropriate means such as a second order hi-pass or band pass filter, such as the filter 50, through which the input signal is fed.

Figure 7:
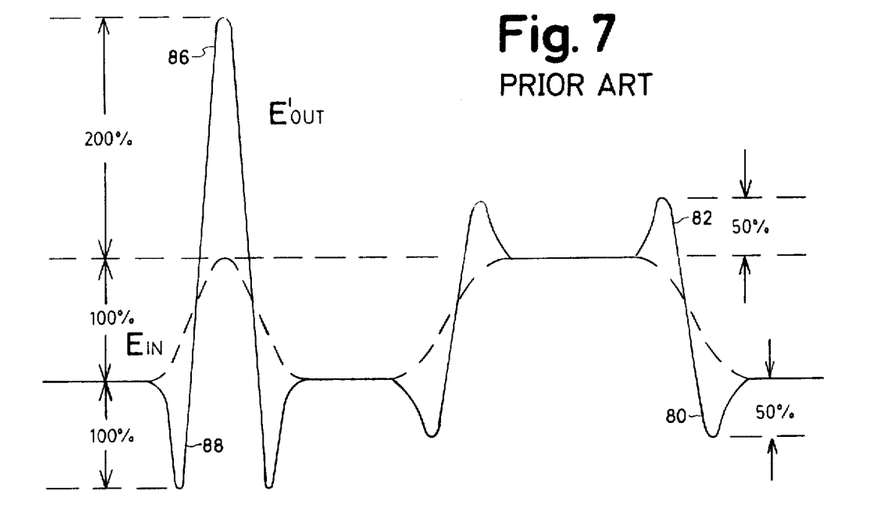
FIG. 7 illustrates a series of steps taken using conventional type peaking systems to achieve fast rise and fall times, and further demonstrates the excessive preshoot and overshoot produced by such prior art systems.

A comparison of the enhanced signal produced by a conventional type peaking circuit is illustrated in FIG. 7. More specifically, FIG. 7 indicates by the waveform labelled (Eout), the addition of the second derivative depicted in FIG. 6C to the input waveform (Ein) depicted in FIG. 6A with the necessary amplitude, to achieve fast rise and fall time comparable with the times depicted in FIG. 6G. It will be noted that the preshoot 82 and overshoot 80 on the bar waveform are approximately 50% of the original transitions. It is also noted that 200% and 100% overshoot 86 and preshoot 88, respectively, exist on the pulse.

Figure 2:
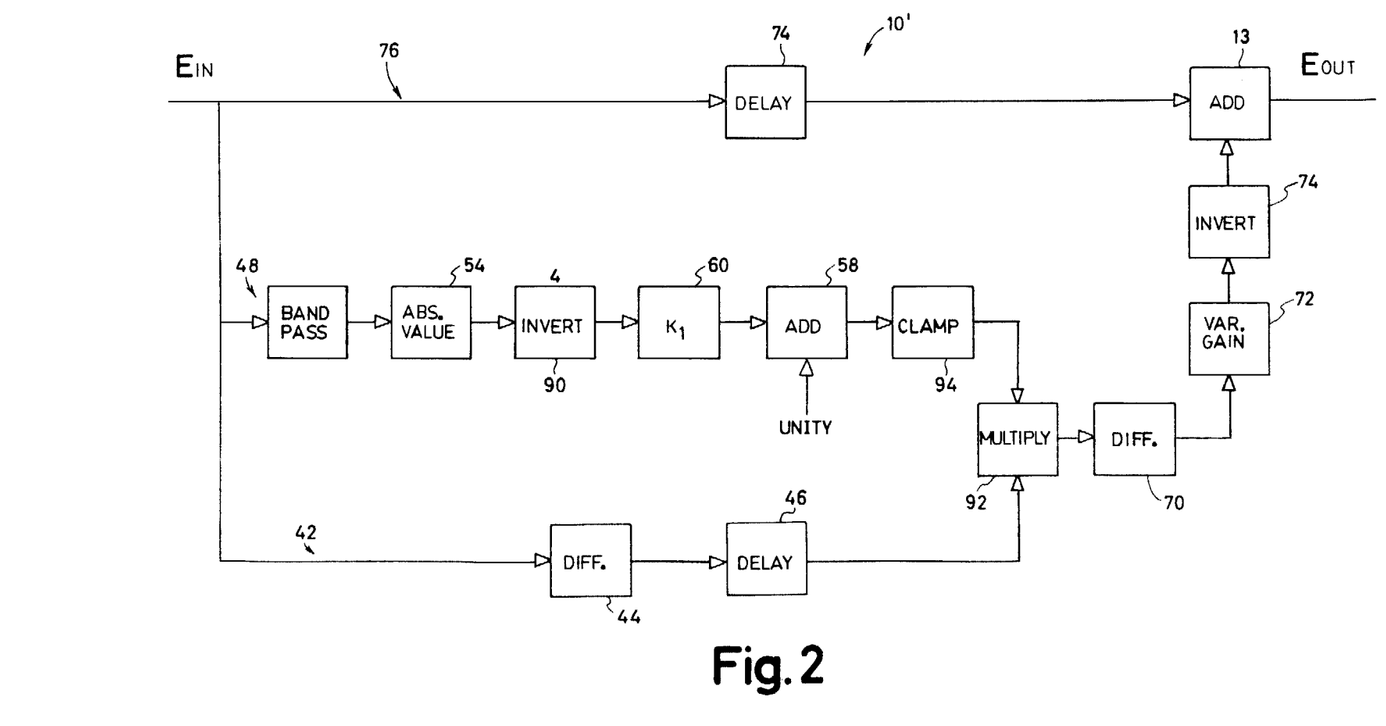
FIG. 2 is a block diagram of an alternate construction of the nonlinear peaking system disclosed in FIG. 1.
Figure 8:
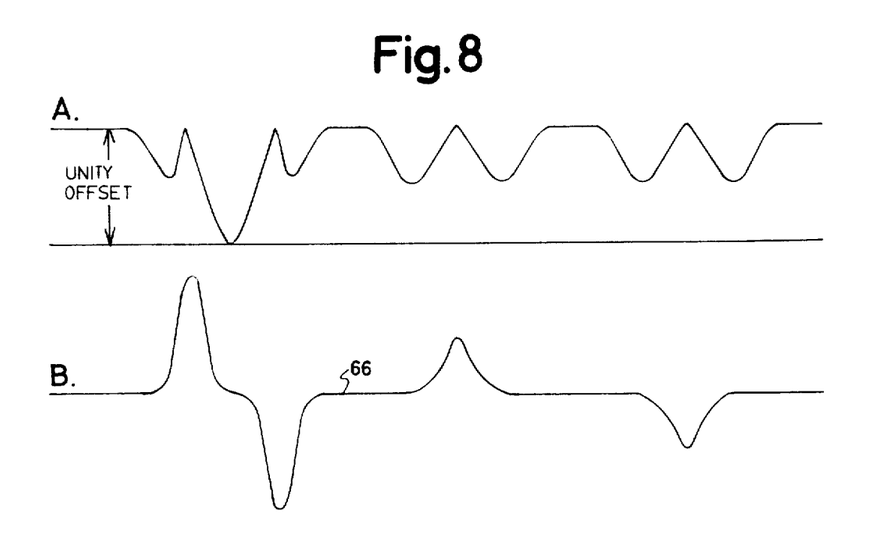
FIG. 8 depicts a sequence of waveforms modified to produce the desired output waveform which is illustrated in FIG. 8E, and which is differentiated to obtain a correction or peaking signal that is added to the delayed input signal to produce an output waveform similar to the waveform depicted in FIG. 6E.

FIG. 2 illustrates an alternate form of a nonlinear peaking system 101 which will produce a correction waveform similar to the output waveform 68 described in connection with FIG. 1. Circuit elements in FIG. 2 which are similar to the circuit elements of FIG. 1 will be marked with like reference numerals. More specifically, FIG. 8A depicts the inverted absolute value of the widened second derivative to which a unity offset has been added to the signal depicted in FIG. 6C. It will be noted that the signal will appear at the output of the circuit 58 in FIG. 2, and that the signal is similar to the signal 56 produced by the circuit 48 of the system depicted in FIG. 1 except that it has been inverted by the inverter 90. If the delayed first derivative signal, such as the signal indicated in FIG. 6B, is multiplied by the waveform of FIG. 8A, as with the multiplier circuit 92, the result will be the waveform of FIG. 8B which is similar to the waveform depicted in FIG. 6E. This waveform can be differentiated as with the circuit 70 to obtain a correction or peaking signal which can be added to the delayed input signal to produce an output wave form similar to that of FIG. 6G. It will be noted that the waveform produced in FIG. 8 uses multiplication rather than division. Care should, however, be taken to prevent the waveform in FIG. 8B from becoming negative. This can be accomplished by using a clamp circuit 94 to clip off any spikes of the waveform which might otherwise go negative. A block diagram depicting the various features of this invention are illustrated in FIG. 2.

Figure 9:
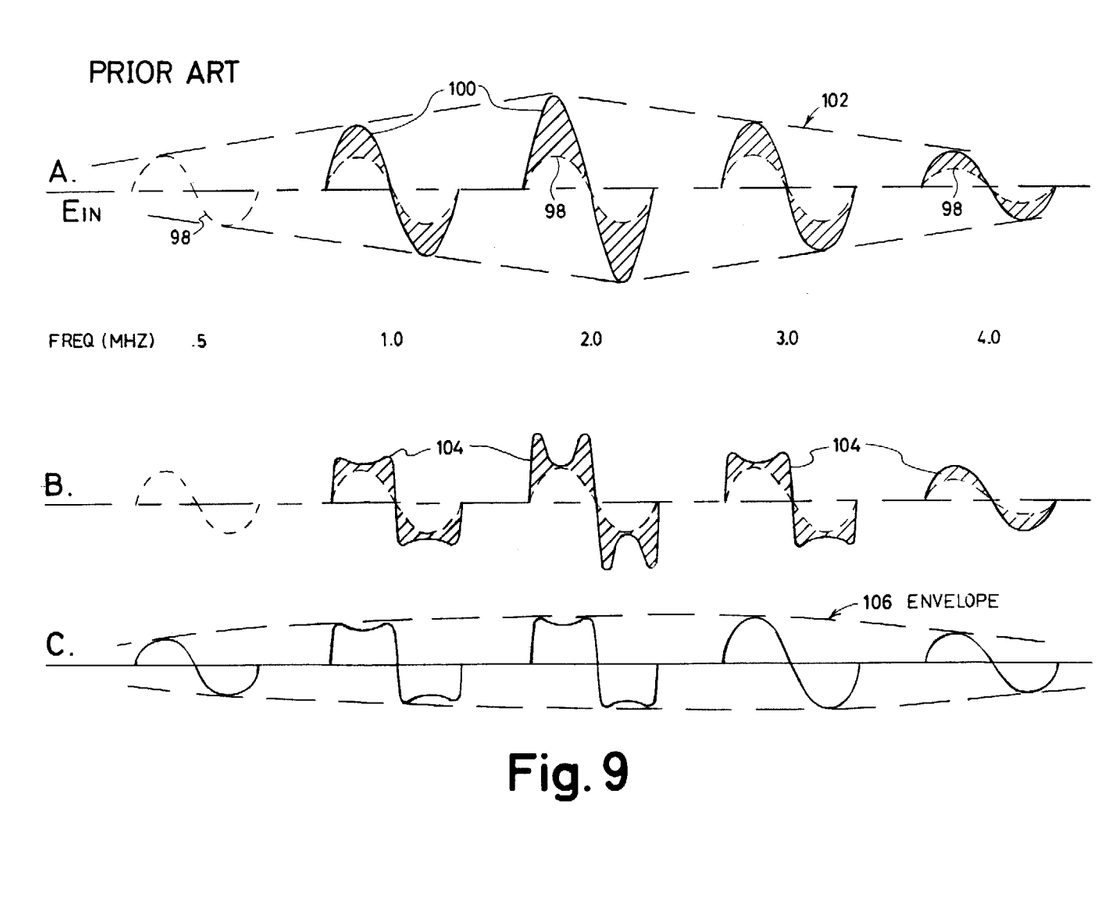
FIG. 9A represents the response to a swept sine wave input of conventional peaking systems.
FIGS. 9B-C represent the response to a swept sine wave input produced by the present invention.

Heretofore, the transient response of conventional peaking circuits and of the invention have been considered. The response to a swept sine wave input such as the input depicted in FIG. 9A as Ein will be considered. When the input signal Ein is applied to a conventional aperture type peaking circuit, a response similar to that shown in FIG. 9A will be produced. The dashed sine waves 98 represent single cycle samples of the input waveform. These samples will be relatively constant in amplitude of up to a frequency of about 3 MHz as will be the case of an intermediate frequency amplifier output of a typical television receiver. It will be noted that the period and spacing of the sine wave samples in FIG. 9 are not to scale. Additionally, the shaded waveforms 100 in FIG. 9A represent the contribution of an aperture correction circuit, on a single cycle basis. By joining the tops and bottoms of the waveform, a typical peaked envelope 102 of the swept output is obtained. The peaked response causes an increase in output for any noise or program component falling near the peak frequency.

The response of the system constructed in accordance with the present invention depicted in FIG. 1 to the same swept input (Ein) is illustrated in FIG. 9B. More specifically, the dashed sine waves represent the input sweep on a single cycle sample basis, without scale for period or spacing. The shaded areas 104 represent the correction waveform or the contribution of the invention. It will be noted that low and high frequencies such as 1 and 3 MHz receive a moderate contribution similar to the amount shown in FIG. 9A of a conventional peaking system, but of a slightly different shape. The 2 MHz contribution is of substantially different shape. At frequencies in the range of approximate 1½ MHz, the divide element indicated at 64 in FIG. 1 produces the greatest alteration in the shape of the first derivative signal. After differentiation, produced by the element 70 in FIG. 1, the contribution of the invention is shown in FIG. 9B. This distortion or alteration in shape is the result of the fact that the band pass element 50 of FIG. 1 allows maximum signal output in the 2 MHz frequency range. Due to bandwidth limitations principally in the video output stages of a typical television receiver, the waveform of FIG. 9B cannot be exactly reproduced in the output terminals of the cathode ray tube.

FIG. 9C shows the resultant sweep waveform samples after bandwidth reduction by the output stages. The sharp contours of the enhancement contributions have been lost, producing an approximately squared shape in the 1 and 2 MHz waveform of the input signals. The 3 and 4 MHz waveform are reproduced as sine waves. Lines drawn joining the tops and bottoms of the swept samples in FIG. 9C give an overall envelope shape 106 to the swept output. The envelope 106 would be considerably flatter than the envelope depicted in FIG. 9A.

It will of course be understood that only the commercial monochrome or color television receiver application of the invention has been described above. However, it should be noted that the system of the present invention can be applied to any input waveform to produce an enhanced or peaked output waveform having decreased rise and fall times with a minimum of preshoot and overshoot. This rise and fall time reduction can be achieved where the characteristics of the hi-pass and band pass filters, which relate to the taking of the first derivative and widened second derivative, respectively, are suitably chosen. To this end, the band width or frequency spectrum of the input waveform should be considered, as will be recognized by those skilled in the art.

From the foregoing detailed description, it will be recognized that a nonlinear edge peaking system has been described and illustrated which incorporates various advantages over the known prior art. The system decreases the rise and fall time of chroma or video transitions without introducing excessive preshoot or overshoot and without distorting the frequency response to a degree that significantly distorts the picture. The system has numerous applications, for example, the demodulated color difference waveforms in a commercial color television receiver could be enhanced to provide reduced rise and fall times. Moreover, color and video waveforms found in television cameras and monitors can also be enhanced by the present system. When the input signal to the nonlinear type peaking system has noise added to it, such as in reception of fringe type television signals, the output correction signal will have reduced noise at the edge transitions. This is a result of the substantial amount of division that takes place during these transitions which reduces the amplitude of the skirts of the first derivative and concurrently the noise along the skirts. Hence, if a coring technique is used to reduce the noise in the non-changing part of the correction signal, this combination with the reduced noise edge transitions would provide a substantially noise free peaking signal.

Although the invention has been described in terms of the illustrated preferred embodiments, many variations and modifications therein will be apparent to those skilled in the art. Accordingly, this invention is intended to cover all such variations and modifications which will fall within the spirit and scope of the appended claims and the equivalents thereof.

I claim:

1. A nonlinear edge peaking system for decreasing the rise and fall times of input signal transitions while maintaining a substantially similar frequency response and attenuating the introduction of excessive preshoot and/or overshoot, said system including:

first circuit means for delaying said input signal;
   second circuit means connected in parallel with said first circuit means including means for taking the widened second derivative of said input signal and means for taking the absolute value of said second derivative of said input signal and for adding a preselected bias to said input signal, whereby the output of said second circuit means is the approximate absolute value of the widened second derivative of said input signal having a preselected bias;
   third circuit means connected in parallel with said first circuit means and said second circuit means including means for taking the first derivative of said input signal and for delaying said input signal such that the outputs of said second circuit means and said first circuit means are time coincident, whereby the output of said third circuit means is the delayed first derivative of the input signal;
   fourth circuit means including means for combining said output of said second circuit means and said output of said third circuit means in a preselected manner and means for modifying said signal produced by combining said output of said second circuit means and said third circuit means to produce a correction signal, and means for adding said correction signal to the delayed input signal produced by said first circuit means to produce an overall waveform modified to contain reduced rise and fall times at the signal transitions with attenuated preshoot and overshoot.

2. The nonlinear edge peaking system of claim 1 wherein said means for taking the widened second derivative of said input signal comprises a band pass filter.

3. The nonlinear edge peaking system of claim 1 wherein said means for taking the approximate absolute value of said second derivative of said input signal comprises an overdriven squaring circuit.

4. The nonlinear edge peaking system of claim 1 wherein said fourth circuit means combines said output of said second circuit means and said output of said third circuit means by taking the ratio of such outputs wherein the output of said second circuit means which is the approximate absolute value of the widened second derivative of the input added to a preselected bias is the denominator of such ratio, and the output of the third circuit means which is the delayed first derivative of the input signal is the numerator of such ratio thereby producing an output of said fourth circuit means which comprises a ratio waveform.

5. The nonlinear edge peaking system of claim 4 wherein said means for modifying said signal produced by combining said outputs of said second circuit means and said third circuit means differentiates and inverts said ratio waveform to produce said correction signal.

6. The nonlinear edge peaking system of claim 1 wherein said second circuit means includes means for inverting said widened second derivative of said input signal, and
   wherein said means for combining said output of said second circuit means and said output of said third circuit means comprises a multiplier circuit.

7. The nonlinear edge peaking system of claim 6 wherein said second circuit means includes a clamp circuit means which prevents the output of said second circuit means from going negative.

8. A nonlinear edge peaking system for decreasing the rise and fall times of input signal transitions while maintaining a substantially similar frequency response and attenuating the introduction of excessive preshoot and/or overshoot, said system including:

first circuit means for delaying said input signal;
   second circuit means connected in parallel with said first circuit means including means for taking the widened second derivative of said input signal, means for taking the absolute value of said second derivative of said input signal; and
   means for adding a preselected offset to said signal after said absolute value has been produced;
   third circuit means connected in parallel with said first circuit means and said second circuit means, including means for taking the first derivative of said input signal and for delaying said input signal such that the output of said second circuit means and said first circuit means are time coincident,
   fourth circuit means for taking the ratio of the output of said second circuit means which is the approximate absolute value of the widened second derivative added to a preselected bias, and the output of said second circuit means serving as the denominator, and the output of the third circuit means which is the delayed first derivative of the input signal which is the numerator thereby producing an output of said fourth circuit means which comprises ratio waveform;
   means for differentiating the ratio waveform, means for inverting the output of the differentiator and adding such output signal to the delayed input signal to produce an overall waveform modified to contain fast rise and fall times without introducing excessive preshoot and overshoot.

9. A method for peaking an input signal to produce an output peaked signal having decreased rise and fall times at the signal transitions while maintaining a substantially similar frequency response and without introduction of excessive preshoot and/or overshoot, said method including the steps of:

delaying the input signal by a preselected time;
   producing a first output signal which is the approximate absolute value of a widened second derivative of the input signal having a preselected bias added thereto;

producing a second output signal which is a delayed first derivative of the input signal;

producing a waveform which is the result of combining said first output signal and said second output signal;

differentiating and inverting said waveform to produce a correction signal; and adding said correction signal produced by differentiating and inverting said waveform to the delayed input signal to produce a peaked waveform modified to contain reduced rise and fall times at the signal transitions without introducing excessive preshoot and overshoot.

10. The method for peaking an input signal of claim 9 wherein said step of producing a first output signal includes the step of inverting said approximate absolute value of said widened second derivative of said input signal having a preselected bias added thereto; and wherein said first output and said second output signals are multiplied.

11. The method of claim 10 including the step of clamping the first output signal to prevent said signal from going negative.

12. The method of claim 9 wherein said waveform produced by combining said first output signal and said second output signal comprises a ratio waveform wherein the denominator of such ratio comprises the approximate absolute value of the widened second derivative of the input added to a preselected bias and the numerator of such ratio comprises the delayed first derivative of the input signal.

* * * * *